United States Patent [19]

Mead

[11] 3,803,587

[45] Apr. 9, 1974

[54] LOGIC SYSTEM

[76] Inventor: Carver A. Mead, 2036 Pasadena Glen Rd., Pasadena, Calif. 91107

[22] Filed: Sept. 11, 1972

[21] Appl. No.: 287,642

[52] U.S. Cl. ............ 340/336, 58/23 R, 235/92 EA, 235/92 SH, 340/324 R

[51] Int. Cl. ............................................. G08b 5/36

[58] Field of Search......... 340/336, 324 R; 58/23 R, 58/23 A; 235/92 EA, 92 SH

[56] References Cited

UNITED STATES PATENTS

| | | | |
|---|---|---|---|
| 3,641,330 | 2/1972 | Hatano et al. | 340/324 R X |
| 3,064,889 | 11/1962 | Hupp | 235/92 EA |
| 3,696,398 | 10/1972 | Pomella et al. | 235/92 EA X |
| 3,714,867 | 2/1973 | Dargent | 58/23 A X |

*Primary Examiner*—David L. Trafton
*Attorney, Agent, or Firm*—Lindenberg, Freilich & Wasserman

[57] ABSTRACT

A programmable logic array in combination with a state counter and a storage circuit, such as a shift register is provided whereby the function of counting various different bases, decoding a count into a seven bar or other code, for example, and strobing a display which utilizes said code, may all be simply implemented on a single chip. The arrangement described finds use in many different electronic instruments.

17 Claims, 6 Drawing Figures

LOGIC SYSTEM

BACKGROUND OF THE INVENTION

This invention relates to logic systems for decoding a sequential count and visually displaying the results of same, and more particularly, to improvements therein.

In a large variety of instruments, it is desired to accumulate a count, which is then decoded and displayed on numeric read-out devices, such as light emitting diodes, or fluorescent numeric indicator tubes. Programmable logic arrays consisting of a matrix of AND gates and a matrix of OR gates, which are commercially available from companies such as Texas Instruments Incorporated, have been employed for performing the general sequential logic functions. However, even with the advantageous tool provided by the logic array, in order to perform functions, such as those which have been mentioned, of accumulating a count, decoding same into a seven bar code for fluorescent numeric indicator tubes, and strobing these tubes for display, a rather large and cumbersome amount of equipment must be assembled.

For example, in order to perform the functions stated in a straightforward manner with the programmable logic array, one flip-flop is necessary for each bit of the counter whose count is to be decoded. For a typical instrument, perhaps eight decades of counters in all are required and thus 32 flip-flops are necessary together with the programmable logic array to do the counting alone. Since each flip-flop requires a set and reset line to be connected to the logic array itself, a very large array is necessary for this simple straightforward function.

An alternative design method is to build a counter consisting of properly interconnected flip-flops in a way that random logic design is done. This process is time consuming and has the additional disadvantage, that it is non-trivial to construct a circuit which will properly strobe an output display. For example, if the output display uses six digit positions, each digit position requires fluorescent indicator tubes, which in turn require a seven bar code, whereby each fluorescent numeric indicator tube can be made to represent the numbers 0—9. In order to minimize the number of lines in the amount of driving structure required, the strobing technique is employed. Each of the similarly placed seven inputs to the fluorescent numeric indicator tubes are connected in parallel. Then, the seven bar code for each digit position is applied to the seven lines and each digit position is strobed in turn synchronously with the presentation of the code for the digit position. The strobing occurs sufficiently rapidly so that the numbers with the six digit position appear to be illuminated continuously.

While this strobe method of operation is well known in the art, it is somewhat awkward to implement. The count which one wishes to display is accumulated in a counter with each flip-flop thereat representing a bit of the output display. These bits are generally decoded through a standard decoder into a seven bar code and applied to the display digit. However, as one wishes to strobe the displays in the manner briefly described, one is faced with the problem of multiplexing the output of the counter sequentially into the decoder and simultaneously strobing the appropriate digit line. While the task is not impossible, it requires a substantial amount of logic and considerable time must be employed in the design.

OBJECTS AND SUMMARY OF THE INVENTION

An object of this invention is to provide a simplified logic system for performing the operations briefly described.

Another object of this invention is to provide a novel and useful logic system for performing the function described.

Still another object of the invention is the provision of a basic logic system arrangement which lends itself to easy design for a multiplicity of logic arrangements.

These and other objects of the invention may be achieved in a system employing a programmable logic array, a state counter, and a shift register. The shift register is employed to accumulate the count of input clock signals. A state counter is employed to minimize the amount of equipment required by providing different interpretations for the counts contained in different stages of the shift register and also to determine which digit in the indicator is to be illuminated. A programmable logic array, to which the state counter and shift register outputs are applied, serves the function of decoding these inputs. In decoding, the programmable logic array increments the count which is entered into the shift register and also alters the state of the state counter at the appropriate time. The programmable logic array also provides the outputs, such as a seven bar code to the display device. The state counter strobes the display device so that the correct numbers are sequentially displayed at a rate sufficiently fast to appear continuous ($\geq$ 60/sec).

By way of illustrating the utility of this invention, two embodiments thereof are shown. One of these is an electrical clock and the other is a general digital instrument, such as a digital voltmeter, which takes the frequency output of an analog-to-digital converter and displays it.

DESCRIPTION OF THE PREFERRED EMBODIMENTS

Figure 1:
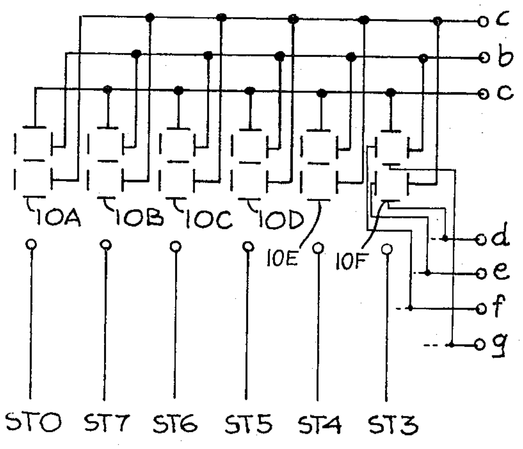
FIG. 1 is a schematic representation of an array of fluorescent numeric indicator tubes in the connections required for their operation in the strobed mode, which as shown to assist an understanding of this invention.

By way of illustrating a display device with which this invention may be used, there is represented in FIG. 1 six fluorescent indicator tubes respectively 10A-10F. Each one of these tubes includes a cathode and seven separate fluorescent sectors which are arranged so that numbers from 0 through 9 may be represented by selectively illuminating the fluorescent sectors. These tubes are well known and commercially available.

Each tube is made to represent a number by applying positive voltages to those of the sectors required to represent the number and a negative voltage to the tube cathode. For example, in order to display a number 1 in the first tube, 10A, then the sectors connected to the lines a and b have positive voltages applied to them while simultaneously a negative voltage is applied to the cathode line identified by ST7 (representing state 7). None of the other sectors which are connected to the a and b lines will be illuminated in view of the fact that no negative voltage is applied to the other cathode lines identified as ST3, ST4, ST5, ST6, ST7, and ST0. It will be noted that all of the corresponding sectors of the tubes 10A-10F are connected to the bus lines ending in the terminals indicated as a through *g*.

Therefore, for the purpose of enabling the indicator shown in FIG. 1 to display six numbers, the practice is to apply a 7-bit code representative of the respective six numbers sequentially to the terminals a through *g*, while sequentially strobing the six cathode lines. If this is done rapidly enough, the illumination of the numbers will appear to be steady.

Figure 2:
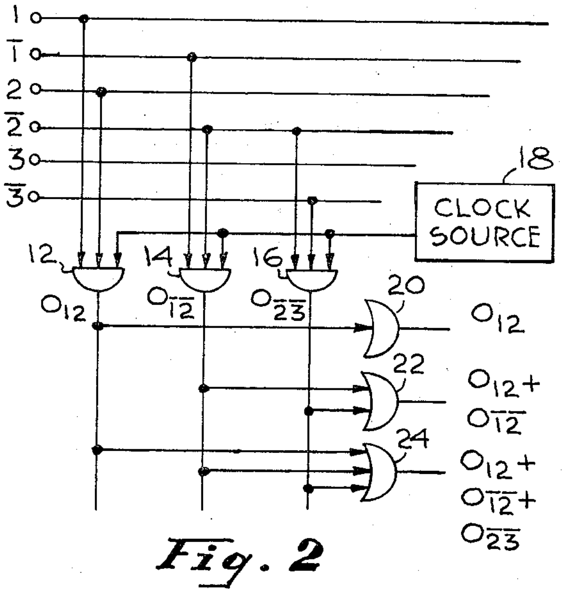
FIG. 2 is a logic diagram, which is a simplified illustration of a programmable logic array shown for the purposes of the assisting in an understanding of this invention.

FIG. 2 is a schematic diagram illustrating a small sector of a programmed logic array, shown to provide a better understanding of this invention. As previously indicated, programmable logic arrays, hereafter designated as PLA are commercially available from companies such as Texas Instruments, Inc. of Dallas, Texas, and comprise an "AND" matrix which drives an "OR" matrix. These matrices are programmable in that once the logic for the operations desired has been written in the form of logical equations, masks can be prepared which are then used for the purpose of producing the desired connections in the AND and OR matrices to accomplish the logic specified.

FIG. 2 shows inputs 1, $\overline{1}$, 2, $\overline{2}$, 3, $\overline{3}$, to the AND gate matrix, represented by three AND gates respectively 12, 14, and 16. Inputs 1 and 2 together with the clock 18 output are applied to AND gate 12. Its output is designated as $0_{12}$. Inputs $\overline{1}$ and $\overline{2}$ together with the clock pulse are applied to AND gate 14, whose output is designated as $0_{\overline{12}}$. Inputs $\overline{2}$ and $\overline{3}$ together with the clock are applied to AND gate 16 whose output is designated as $0_{\overline{23}}$.

The OR gate matrix is represented by OR gates 20, 22 and 24. OR gate 20 has an input, the $0_{12}$ output of AND gate 12 together with the clock 18 output. OR gate 20 output is designated as $0_{12}$. OR gate 22 has as its inputs, AND gate 14 and AND gate 16 outputs, together with the clock. Its output is designated as $0_{12} + 0_{\overline{12}}$. OR gate 24 has as its inputs all of the AND gate outputs, and its output is represented by $0_{12} + 0_{\overline{12}} + 0_{\overline{23}}$. When a clock pulse, from the clock pulse source is applied to the AND gates and OR gates, the AND gates transfer their outputs to the OR gates and the OR gates provide their outputs for use as required.

Figure 3:
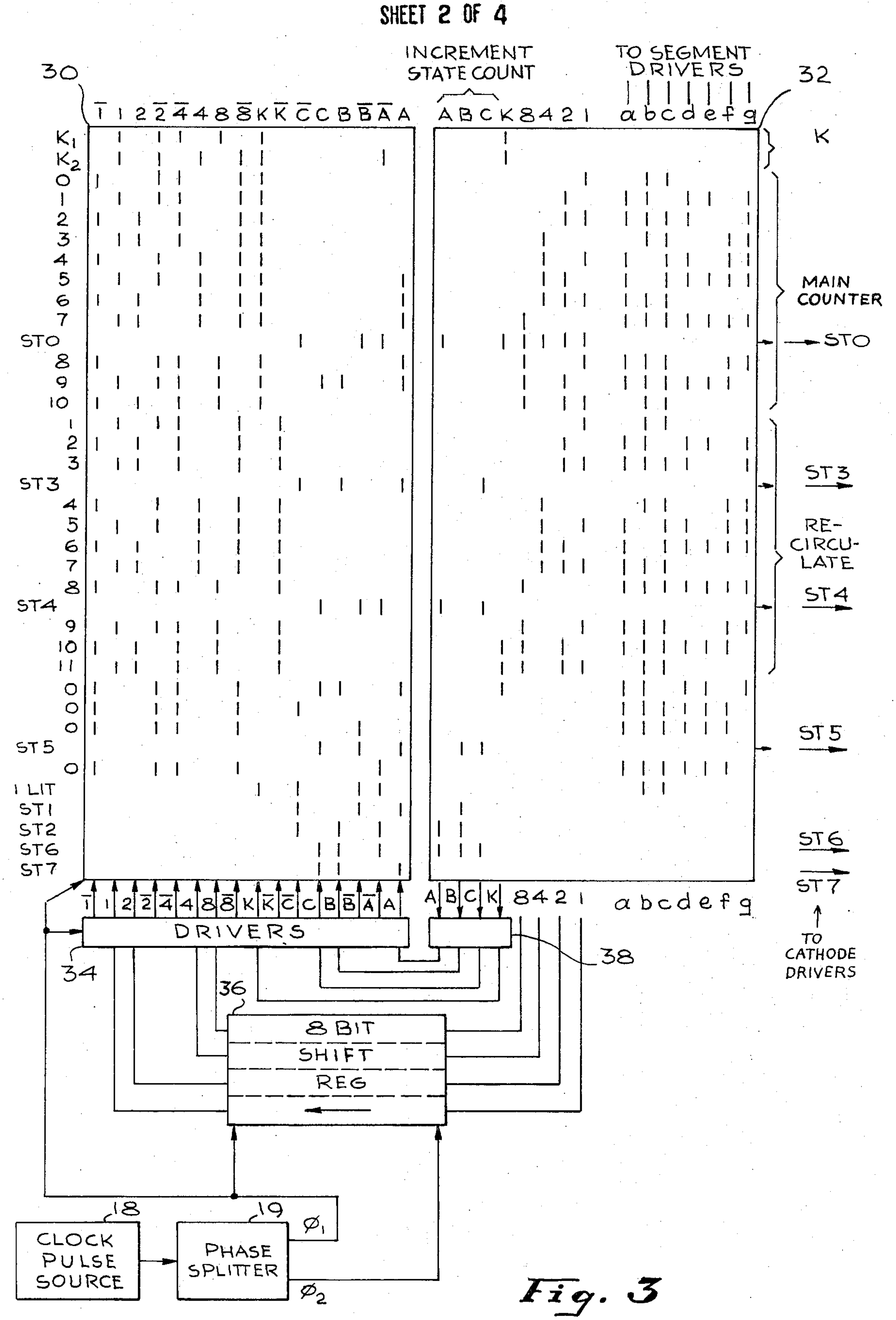
FIG. 3 is a schematic diagram illustrative of a clock embodiment of this invention.

Referring now to FIG. 3, there may be seen a block schematic diagram of an illustrative embodiment of this invention. This is an electric clock, and is shown by way of illustration and should not be considered as limiting the scope or use of the invention. Rectangle 30 represents the AND gate matrix. The inputs to the AND gate matrix are applied thereto by driver amplifiers designated as drivers 34. Each specific driver output is indicated adjacent to the lines connecting the drivers to the AND gate matrix 30 and comprise the outputs received from a 4-bit shift register 36, (four 8-bit long shift registers operated in parallel), together with the outputs from a 4-bit counter 38. The driver outputs in response to inputs from the shift register are designated by 1, $\overline{1}$, 2, $\overline{2}$; $\overline{4}$, 4, 8, $\overline{8}$. The driver outputs in response to inputs from the counter are designated by K, $\overline{K}$; $\overline{C}$; C, B, $\overline{B}$; and $\overline{A}$, A. The four inputs to the counter from the OR gate matrix are A, B, C, and K, where K is a carry state. The inputs to the shift register, which are received from the OR gate matrix, are designated 8, 4, 2 and 1 and are applied to the respective four inputs of the 4-bit wide shift register 36. Another set of OR gate matrix outputs are designated as *a, b, c, d, e, f, g,* and correspond to the seven bar code used to select the segments of a display arrangement such as is shown in FIG. 1. The last set of AND gate matrix outputs are designated as states 0, 3, 4, 5, 6 and 7, and are shown as outputting from the OR gate matrix for convenience, and are used to excite the cathodes of the display arrangement shown in FIG. 1.

On the left side of the AND gate matrix 30 are represented the various shift register counts, carries, (K) and states (ST) of the state counter which are decoded by the AND gate matrix in response to the inputs which are applied thereto. For ease in understanding the decoding arrangement, the inputs to the AND gate matrix are shown at the top as well as the bottom of the rectangle 30. Thus, $\overline{1}$ appearing at the top and bottom of the rectangle, represents the fact that if a $\overline{1}$ input is present, it is applied to that entire column. Similarly, "8" appearing at the top and bottom of the rectangle designates the fact that that one input to the entire column of AND gates will be high when an 8 input is applied thereto.

The small vertical lines within the AND gate matrix indicate the location at which the inputs to the AND gates, which may be assumed as being applied to column buses, are connected to the AND gate inputs. It will be understood, that all of these inputs must be high, and a clock pulse must be received, in order that an output be applied to the OR gate matrix. Thus, by way of illustration, observing the first 4 from the top on the left side of the AND gate matrix 30, vertical lines will be observed at the $\overline{1}$ column, the $\overline{2}$ column, the 4 column, the $\overline{8}$ column and the K column. This means that the AND gate matrix decodes a 4 when a 4 is applied to the inputs from the 8-bit shift register and the carry K is applied from the state counter. Observing now the OR gate matrix, the decoding of a "4" causes a 4 and 1 input (5) to be applied to the input of the shift register and a positive signal be applied to sectors *a, c, d, f, g,* (7-bar code for 5). As another example, the AND gate matrix decodes the state 3 of the state counter when there is a $\overline{C}$, B, and A input applied to the matrix from the state counter. This results in the C stage of the state counter to go high (4) and a negative signal to be applied to the cathode of the right indicator tube (see FIG. 1).

From the foregoing, it should be apparent how the AND gate matrix 30 decodes its inputs to provide outputs to drive the OR gate matrix 32.

The clock pulse source 18, supplies clock pulses at a frequency of 480 pulses per second. Its output is applied to a phase split circuit 19. The phase split circuit 19 provides a $\phi_1$ output pulse in response to the leading edge of a clock pulse from the clock source 18, and a $\phi_2$ pulse in response to the trailing edge of a clock pulse in the clock source. The $\phi_1$ and $\phi_2$ pulses cause the 8-bit register to be shifted one bit position. The $\phi_1$ pulse causes a number at the output stage of the 8-bit shift register to be applied to the drivers of the AND gate matrix and also serves as the clock pulse which enables the AND and OR gate matrices to respond thereto. The $\phi_2$ pulse enters outputs from the OR gate matrix into the state counter and into the 8-bit shift registers. The OR gate matrix also, in response to the phase 1 pulse, provides the a through g outputs as well as the ST0 through ST7 outputs which are required to drive the visual display.

The shift register accumulates counts which are circulated out of the shift register into the AND gate matrix across into the OR matrix and where they are updated and sent back into the shift register input. This circulating data, one digit at a time, passing through the PLA is decoded into the seven bar code (or whatever code is appropriate for the display devices being used) and is presented to the output sequentially. Thus, it is in the ideal format for strobing displays automatically. In accordance with the example which has been selected to illustrate this invention, the shift registers is 8-bits long, and 4-bits wide, providing an 8 decade counter, and there are three state flip-flops A, B, C which count from 0 to 7, as well as a carry flip-flop K. The count in the counter advances each time the shift register is shifted. By the time a number is shifted from the input to the output of the shift register, the state counter will have counted through an entire cycle. Thus, the state counter can keep track of (or identify) each number which is applied to the shift register and which is subsequently applied by the shift register to the AND plane for decoding. The significance of this will become more clear as this explanation progresses.

One of the outstanding features of the arrangement shown herein, is that it is very easy to count in different number bases for the different digits to be displayed. This is illustrated by the example selected herein of the arrangement shown in FIG. 3 constituting the circuitry for an electric clock which displays seconds in the two tubes shown in FIG. 1, respectively 10E, 10F, minutes in the two tubes respectively 10C and 10D, and hours in the two tubes respectively 10A and 10B. A counter which counts seconds, minutes, and hours, must count in the base ten for the least significant seconds digit, base six for the most significant seconds digit, base 10 for the least significant minutes digit, base six for the most significant minutes digit, and base 12 for the hours digits. This arrangement is easily implemented by incrementing the second and minutes least significant digits back to zero after they reach 9, while provided with a carry, and for the most significant digits, the counter is incremented back to zero after a count of 5 while provided with a carry generated from a previous digit. The carry flip-flop K functions to remember that a carry has been generated. The initial carry for the least significant digit can be generated either by an external input, or, in a case of the simple counter, by the fact that the state flip-flops indicate that the least significant digit is about to be loaded.

Considering now more particularly the implementation of an electronic clock, which is provided by the system arrangement shown in FIG. 3, the basic input clock frequency provided by the clock source is 480 cycles per second, synchronized with the 60 cycle AC line. This means that all the data in the 8-bit shift registers will be fully recirculated once each 1/60 of a second. The state counter is incremented each clock cycle, and cycles from zero to seven and back to zero again. Counting is performed by incrementing the count in the shift register using the PLA. The count in the state counter is decoded to indicate which digit is being displayed at that particular time, for example, in states 1 and 2, no digits are being displayed, but the shift register counter is counting the cycles from line frequency to seconds. In states 3 and 4, the shift register counter is counting seconds from 0 to 60 and when decoded in state 3, the least significant seconds digit is displayed and in state 4, the most significant seconds digit is displayed. In state 5, the register counter is counting minutes and when decoded the least significant minute digit is displayed. In state 6, the most significant minute digit is counted and when decoded is displayed. When state 7 is reached, the shift register counter is made to count to the base 12, which counts hours. When decoded, hours are displayed. When the hours count is in excess of nine, the carry flip-flop is set, which together with an indication of state zero, enables the display to show the "1" for the most significant hours digit. The shift register, while in state 0, is set to the "dummy" code 1111 and is not used in the counting or display process.

Regarding the state 0 line in the AND plane in FIG. 3, the counts represented above that line from 0–7 all occur during state 0. It will be recalled previously that when the system is initiated, its K flip-flop is high and a zero count is in the state counter. Thus, when the AND plane receives an $\bar{8}$, $\bar{4}$; $\bar{2}$; $\bar{1}$, and a K signal, the AND plane (as may be seen on the "0" line), enables the OR plane to stuff a "1" into the shift register. Also, sensing state "0" of the state counter enables the "OR" plane to stuff a "1" in the state counter and the carry flip-flop is maintained in its "K" state.

At the end of 1/60 of a second, the AND plane senses the 1, $\bar{2}$, $\bar{4}$, $\bar{8}$ outputs from the shift register and the O and K outputs of the state counter. The OR plane in response to the output of the AND plane at this time, stuffs a 2 into the 8-bit shift register while the state counter has a "1" inserted therein.

It should be remembered that the state of the state counter and the numbers or counts in the shift register are obtained from the PLA and thus, the logic can be selected to make these counters follow any desired number scheme. Thus, the logic is arranged so that when the state counter is in state 1 and then in state 2, the numbers which sequentially appear at the output of the register are respectively the units and tens counts of 1/60th of a second. When the state counter then counts through the third and fourth states, the outputs of the register presented for decoding are respectively the units and tens counts of seconds. When the state counter then counts through the fifth and sixth counts, the outputs of the register presented for decoding are respectively the units and tens count of minutes. When the state counter then counts through the seventh count, the outputs of the register presented for decoding are the binary count of hours. The PLA serves the function of decoding and increasing the state counter counts and decoding and increasing the register counts to the proper number bases.

Now to specifically illustrate the operation of the system shown in FIG. 3, let it be assumed that the clock time is 11:59:59:59. This time is in the shift register and is being read out. It is read out of the shift registers least significant digit first. The tables below show the contents of the shift register, the states of the state counter as each digit in the shift register appears at the output stage, the seven bit code lines to the display which are excited and the number illuminated. The tables below also show the new entries into the shift register, the state counter counts as these new entries appear at the shift register output stage and the seven bit lines selected and the number illuminated on the next 1/60th second of operation of the device.

Now, the first seven stages of the shift register, counting the output stage as 1, all contain zeros while the last stage contains all ones. Considering the contents of the shift register, and the states of the K flip-flop and the state counter, it will be seen from the AND and OR gate logic that during the subsequent states 3, 4, 5, 6, 7, and 0, the indicated will illuminate 00:00:21, indicating the time 12:00:00.

From the foregoing, it should be apparent how the system operates in response to clock pulses to produce a display of time. The shift register, in response to the logic, counts in a number of different number bases and the state counter keeps track of the different counts in the shift register.

| | | 1 | 2 | 3 | 4 | 5 | 6 | 7 | 0 | 1 | 2 | 3 | 4 | 5 | 6 | 7 | 0 | |
|---|---|---|---|---|---|---|---|---|---|---|---|---|---|---|---|---|---|---|
| State counter | A | 1 | 0 | 1 | 0 | 1 | 0 | 1 | 0 | 1 | 0 | 1 | 0 | 1 | 0 | 1 | 0 | |
| | B | 0 | 1 | 1 | 0 | 0 | 1 | 1 | 0 | 0 | 1 | 1 | 0 | 0 | 1 | 1 | 0 | |
| | C | 0 | 0 | 0 | 1 | 1 | 1 | 1 | 0 | 0 | 0 | 0 | 1 | 1 | 1 | 1 | 0 | |
| | K | 1 | 1 | 1 | 1 | 1 | 1 | 1 | 1 | 1 | 0 | 0 | 0 | 0 | 0 | 0 | 1 | |
| Shift register | 1 | 1 | 1 | 1 | 1 | 1 | 1 | 1 | 1 | 0 | 0 | 0 | 0 | 0 | 0 | 0 | 1 | New entries |
| | 2 | 0 | 0 | 0 | 0 | 0 | 0 | 1 | 1 | 0 | 0 | 0 | 0 | 0 | 0 | 0 | 1 | |
| | 4 | 0 | 1 | 0 | 1 | 0 | 1 | 0 | 1 | 0 | 0 | 0 | 0 | 0 | 0 | 0 | 1 | |
| | 8 | 1 | 0 | 1 | 0 | 1 | 0 | 1 | 1 | 0 | 0 | 0 | 0 | 0 | 0 | 0 | 1 | |
| | a | | | 1 | 1 | 1 | 1 | | | | | 1 | 1 | 1 | 1 | 1 | | |
| | b | | | 1 | | 1 | | 1 | 1 | | | 1 | 1 | 1 | 1 | 1 | 1 | |
| | c | | | 1 | 1 | 1 | 1 | 1 | 1 | | | 1 | 1 | 1 | 1 | | 1 | |
| Display | d | | | | 1 | | 1 | | | | | 1 | 1 | 1 | 1 | 1 | | |
| | e | | | | | | | | | | | 1 | 1 | 1 | 1 | 1 | | |
| | f | | | 1 | 1 | 1 | 1 | | | | | 1 | 1 | 1 | 1 | 1 | | |
| | g | | | 1 | 1 | 1 | 1 | | | | | | | | | | | |
| | | | | 9 | 5 | 9 | 5 | 1 | 1 | | | 0 | 0 | 0 | 0 | 2 | 1 | |

From the foregoing, it will be seen that the output stage of the shift register contains a nine (1001) and the state counter shows state 1, and the K stage high. This is decoded by the K1 and ST1 lines of the AND gate matrix which results in a zero being stuffed into the shift register and a K and a 2 (010) being inserted into the state counter.

The next clock pulse brings a 5 to the output of the shift register. The K2 and ST2 lines of the AND gate matrix decodes the 5 and state 2 and K with the result that the OR gate matrix will insert 0 into the shift register, the K flip-flop is high and the state counter assumes state 3 (011).

The next clock pulse brings a 9 to the shift register output. The K1 and ST3 lines of the AND gate matrix decodes the input signals with the result that a 0 is stuffed into the shift register, the K flip-flop is high and the state counter assumes state 4 (100).

The next clock pulse brings a 5 to the shift register output stage. The K2 and ST4 lines of the AND gate matrix decode the input signals with the result that a 0 is stuffed in the shift register, the K flip-flop is high, and the state counter assumes state 5 (101).

The next two clock pulses respectively bring a 9 and a 5 to the register output stage which are decoded as before and result in stuffing two more zeros in the shift register. The K flip-flop of the state counter remains high.

At the next clock pulse an 11 appears at the output stage of the register. The k flip-flop remains high. The state counter shows state 7. The K flip-flop is set. All zeros are stuffed into the shift register and the state counter goes to its zero state.

At the next clock pulse, the line designated as "1 Lit" is activated so that the 1 light goes on. All ones are stuffed into the register.

The PLA may also be used to implement a completely general, digital instrument function. In this function there are two counters, one which counts the output of an analog-to-digital converter, the other which counts clock pulses in exactly the same way as they are counted in the clock chip. When the count of one of these counters reaches an arbitrary number, for example, 9999, the contents of the other counter is transferred into a third register. The function of this third register is to recirculate the final results of the count, so that it may be displayed in exactly the same way as it was in the previous embodiment of the invention.

Figure 4:
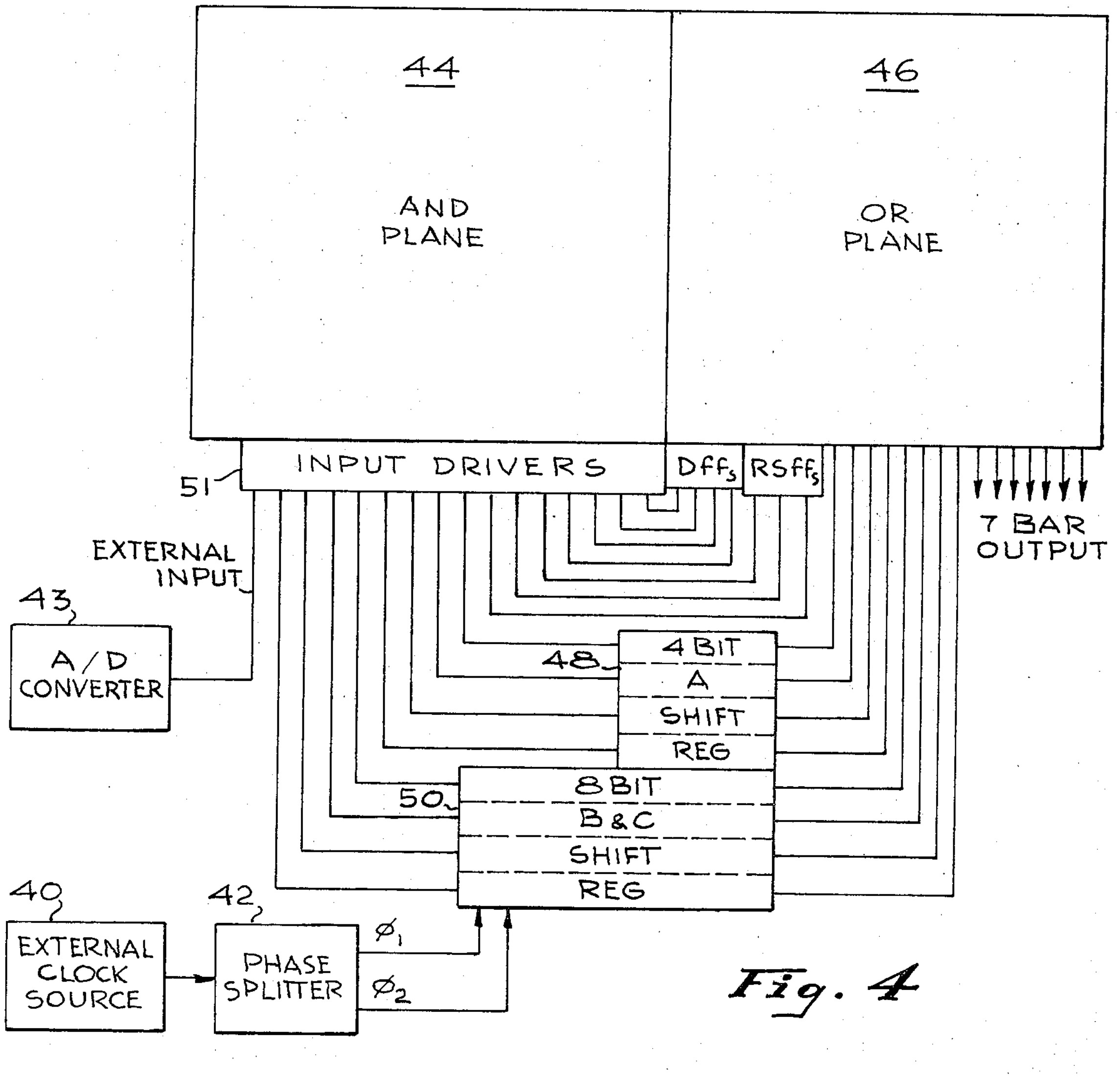
FIG. 4 is a schematic representation illustrative of a general digital instrument embodiment of the invention.

FIG. 4 is a block schematic diagram of this invention.

Figure 5B:
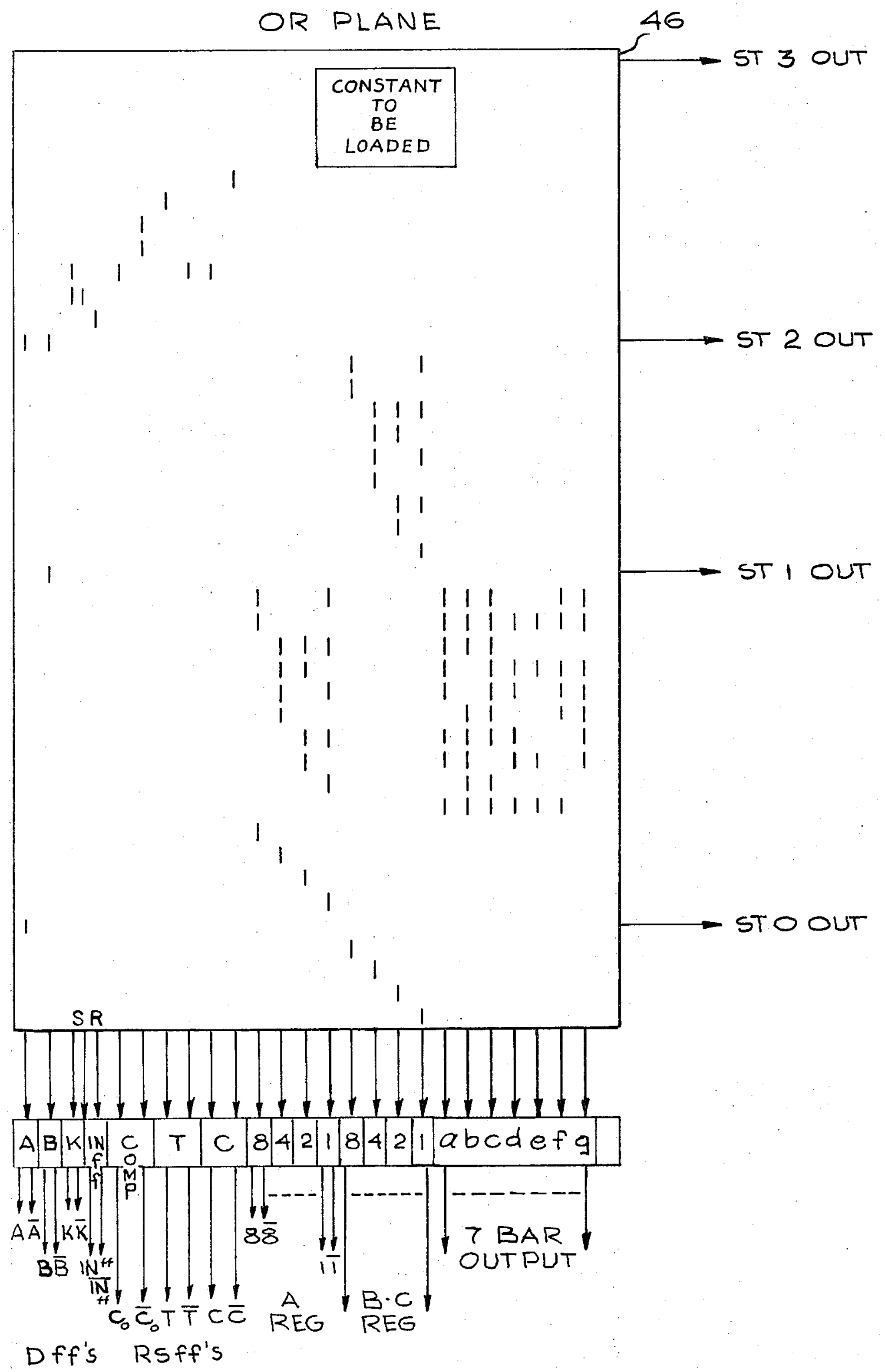
FIGS. 5A and 5B are a schematic representation of the logic employed in the AND and OR matrices which are used in FIG. 4.
Figure 5A:
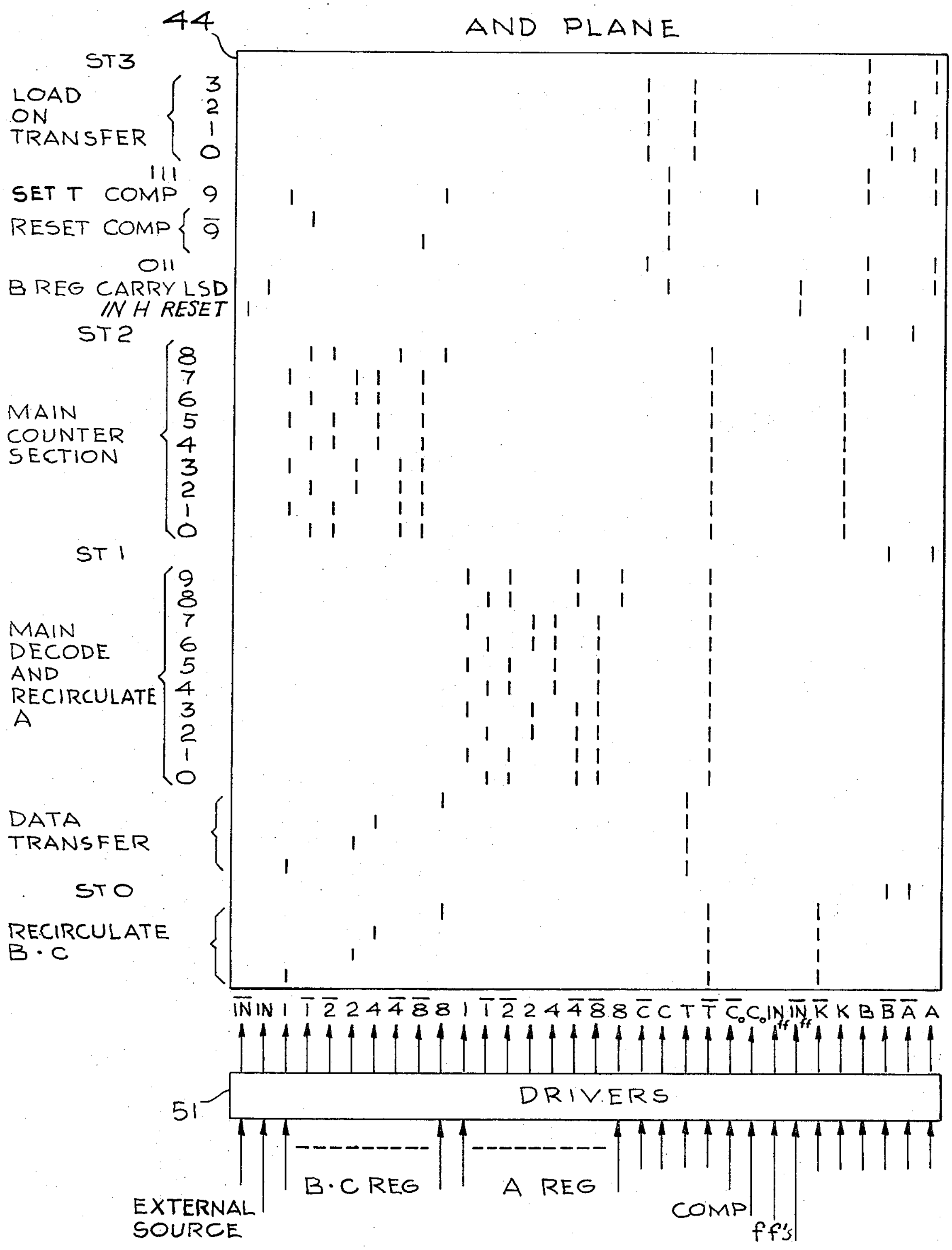

FIG. 5 is a detail of the logic found in the AND plane and in the OR plane.

Referring to FIG. 4, the embodiment of the invention includes an external clock source 40, whose output is applied to a phase splitter 42, which generates, in response thereto, a first pulse on the leading edge of the input clock pulse and a second pulse on the trailing edge of the input clock pulse. The phase splitter pulses enable the gates of the AND plane 44, and the OR plane. The embodiment of the invention also includes an external frequency source, such as an analog-to-digital converter 43 of a digital voltmeter which converts voltage amplitude to pulses at a representative frequency. As will be shown in more detail in FIG. 5, the output of the OR plane drives "D" flip-flops and "RS" flip-flops which comprise a state counter which has three flip-flop stages A, B, and C, as before together with a carry flip-flop, designated as K. In addition, there is an IN flip-flop, a COMP flip-flop standing for "compare," and a T flip-flop standing for "transfer." There is one 4-bit wide, 4 stage shift register 48, designated as the A shift register, and one 4-bit wide by 8-bit long shift register 50, designated as the B and C shift registers, each of which is 4 bits wide and 4 bits long. The D and RS flip-flops, together with the shift register apply their outputs to "input drivers" 51, which in turn drive the gates in the AND plane 44.

FIG. 5 shows the details of the logic of the AND plane and the OR plane. The driver inputs to the AND plane are designated on the bottom of the rectangle 46 and as indicated previously, consist of the outputs from the A, B, and C registers, from the state counter, from the transfer flip-flop T, from the compare flip-flop COMP, the input IN and $\overline{IN}$ from the external source, and the input synchronization flip-flop labeled $IN_{ff}$. The outputs from the OR plane are shown at the bottom of the OR plane and include the A, B, C and K inputs to the state counter, the 8, 4, 2, and 1 inputs to the A register, the 8, 2, 4 and 1 inputs to the B and C registers, inputs to the $IN_{ff}$, T and C flip-flops, and the a through g seven bar outputs, which drive the indicators. It should be noted that the COMP, T and C flip-flops are RS flip-flops, while the A, B, K and $IN_{ff}$ flip-flops are D flip-flops. On the right side of the OR plane 46 are shown the state outputs derived from the AND plane, which energize the cathodes of four display tubes.

State 0 is decoded by the horizontal line of gates of the AND plane labeled ST0 in response to the $\overline{A}$ and $\overline{B}$ outputs of the state counter. In response, the state 0 output shown on the left side of the OR plane is strobed, and the state counter flip-flop A is set into its 1 state, thus, indicating state 1.

State 1 is decoded in the AND plane from the A and $\overline{B}$ outputs of the state counter, in response to which the state 1 output line is strobed and the OR plane inserts state 2 into the state counter.

State 2 is decoded from the B and $\overline{A}$ outputs of the state counter by the AND plane, and is used to increment the state counter to the 3 state, (both the A and B flip-flops high), and also to strobe the state 2 output line.

State 3 is decoded by sensing the A and B flip-flop outputs of the state counter and is used to strobe the state 3 digit line output from the OR plane. The A and B flip-flops of the state counter are then both returned to 0 by output from the OR plane. It should be noted that, of the 8 possible states of the state counter, A, B and C, only the least significant two-bits are decoded for the strobe outputs. The most significant, or C bit, is used to determine whether the output of the B register or the C register is to be presented to the AND plane for decoding. The A and B bits of the state counter are used to determine which digit within the B register, C register, or A register is to be presented to the AND plane. For this reason, the state 3 output of the state counter is sensed, whether the state counter is in its 111 state or 011 state. For purposes of the strobe output decode, the condition of the C flip-flop is disregarded. The C flip-flop is set on the 011 count and reset on the 111 count, in order for the count to follow the binary sequence of the truth table.

The outputs of the A register are decoded as from 0 to 9 by that portion of the AND plane which is labeled "Main Decode and Recirculate". Whatever count is decoded by the AND plane from the output of the A register, is stuffed back into the input of the A register, provided that the output of the T flip-flop is low, (thereby making $\overline{T}$ high). However, when the T flip-flop is set, the data which is in the B register is moved directly into the A register. This is the function of the decoding logic shown in that portion of the AND plane which is labeled "Data Transfer".

The logic which increments the B or C register digits, is shown under the "Main Counter Section," of the AND plane, and is in this particular example, programmed as an up counter, working in the decimal system. This counter works in exactly the same manner as the counter in the clock PLA shown in FIG. 3. Whenever the carry "K" is set, the shift register count, presented to the decoder, is decoded into a one out of nine code, and a number which is one count larger than the decimal number decoded is applied to the input of the register, thus incrementing the digit as that particular digit location of the register.

The carry flip-flop K is set in a different manner for the B register than it is for the C register. For the C register, the carry is always set for the least significant digit thereby incrementing the output by one for every circulation of the combined B and C registers. This is done by setting the carry flip-flop on 011, thereby making the carry high during the state 100, which is the least significant digit of the C register. The carry K is set for the B register on the edge of an input received from the external source (such as an analog-to-digital converter). This is done by the logic in the AND plane along the line which is labeled "B Register Carry, LSD" (Least Significant Digit), which operates as follows. When the input line IN goes high, there will be a period where IN is high but $IN_{ff}$ has not yet been clocked high. During the first state 111 in this period, this line will go high, since it is decoded from IN and $\overline{IN_{ff}}$ and A, B, C. During this input of the $IN_{ff}$, will bring both K $IN_{ff}$ high and hence, the B register carry will be set on the following-state 000. In this manner the least significant digit of the B register is incremented on the final state 000 following each leading edge of the input.

The operation of transferring the contents of the B register into the A register when the C register reaches a count of 999, is performed by operation of the compare and transfer flip-flops C and T as follows.

The compare flip-flop is used to determine when the count in the C register has reached 9999. It does this by always being set when the state count is 011 and is reset when the C register does not have a 9. The logic lines of the AND plane, which are labeled "Reset-COMP-$\overline{9}$" sense if there is a $\overline{1}$ or an 8. If there is, they reset the compare flip-flop. If by the time the state count has reached the 111 state, the set transfer line ("Set T-COMP 9") senses the presence of a 1 and an 8 in the C register, and also if the compare flip-flop is still high, the set T line enables the OR plane logic to set the transfer flip-flop "T." Thus, when in the course of circulating state 000 comes around, and T is high, the output of the B register will be ready to be emptied into the A register over the next 4 bit interval. The transfer flip-flop is always reset on state 011, so that only the B register contents are transferred.

During the period of the transfer, it is desired to load or clear the B register so that the count may resume anew. This is accomplished by the coding in the lines of the AND plane which are labeled "Load on Transer." These lines merely decode the appropriate bits to be placed in the B register at the time when a transfer takes place. If no bits are placed in the box shown in the OR plane which is labeled "Constant to be Loaded," then all zeros will be loaded into the register. If a code other than zero is placed in the box, then the digits to the B register will be set to the appropriate code. For the present implementation, when the B register is cleared, no constant is entered during transfer. However, in many analog-to-digital converter schemes, it is desirable to be able to add or subtract a constant from the count. That is the function of the circuitry just described.

The arrangement just described is placed on a chip which measures only slightly over 100 mils on a side and implements a completely general, four digit digital meter function which is required for use in voltmeters, digital thermometers, frequency counters, or any other functions, where the input variable may be converted to a frequency. If the input variable is converted into a time rather than a frequency, it would be desirable to count the clock pulses and transfer them to the A register from the C register, when the B register reaches a count of for example, 9999. This function can be directly implemented on this chip merely by interchanging the functions to the B and C register, that is, by having the B register increment during every state 000, and having the C register increment by one, when the input goes high. This is accomplished by merely interchanging C and $\bar{C}$ between the carry inputs for the C register and the B register.

It should be noted that the display is of the A register contents, which are decoded and recirculated into the A register until such time as they are altered by the transfer thereinto of the contents of the B register. The B register contents are transferred into the A register when the C register reaches a count of 9999. Whether a B register or C register output is being applied to the AND plane for decoding is determined by the state of the most significant flip-flop of the state counter.

When the B or C registers are not being incremented and are merely recirculating, the one output is fed back into the one input and so forth for the other bit positions by the lower four lines labeled "Recirculate B and C." Since this is a direct recirulation function and requires no decoding, some structure can be saved by using only four lines to recirculate the data rather than decoding into a one out of 10 code and then inserting those codes into the B and C register. This cannot be done exactly the same way for the A register, since every digit of the A register must be decoded and displayed by the display tubes. It should be noted again that for every complete cycling of the B and C registers, the A register makes two rotations or cycles, thus the strobing rate for the display is twice the maximum counting rate for the B register and the self-counting rate for the C register. The B and C registers are placed in series in order to avoid duplication of the incrementing and recirculating functions. Since these functions are identical for both registers, they are time shared.

While the programmable logic array described herein has been indicated as an array of AND gates and OR gates, it will be understood that this is by way of example and should not be considered as a limitation upon the invention. Thus, programmable arrays may be made up of NOR gates or NAND gates or other logical arrays and still should be considered as coming within the scope of this invention and its claims.

There has accordingly been shown and described herein a novel and useful logic arrangement suitable for use for a wide variety of instruments.

What is claimed is:

1. A logic system comprising:

shift register means having inputs and outputs, state counter means having inputs and outputs, a source of clock pulses, an array of logic gate means responsive to said clock pulses and digital counts from said shift register means and state counter means outputs to apply digital counts to said shift register means inputs and to said state counter means inputs.

2. A logic system as recited in claim 1 wherein there is provided an external source of digital pulses, and means for applying pulses from said external source of digital pulses to said array of logic gate means to enable said logic gate means to alter the count in said shift register means.

3. A logic system as recited in claim 1 wherein said logic gate means includes gate means for generating a display code output responsive to predetermined digital count inputs to said logic gate means from said shift register means and said state counter means, and display means responsive to said display code for visually displaying digits represented by said display code.

4. A logic system as recited in claim 3 wherein said gate means for generating a display code output responsive to digital count inputs to said logic gate means from said shift register means and said state counter means includes, means responsive to the outputs of said shift register means for generating display outputs, means responsive to the outputs of said state counter means for generating different display strobe signals, and means for applying said display outputs and said display strobe signals to actuate said display means.

5. A logic system as recited in claim 1 wherein said shift register means includes first shift register means and second shift register means, said logic gate means includes means for applying said predetermined digital counts to said first shift register means for circulation back into said logic gate means, and said logic gate means further includes means responsive to digital counts received from said second shift register means and state counter means outputs for entering other digital counts into said second shift register means and said state counter means.

6. A logic system as recited in claim 5 wherein there is included a transfer flip-flop and a compare flip-flop:

means in said logic gate means responsive to a first predetermined count of said state counter for driving said compare flip-flop to its set state, means in said logic gate means responsive to a predetermined count state in the output of said second shift register and said compare flip-flop being in its set state for driving said transfer flip-flop to its set state, means in said logic gate responsive to said transfer flip-flop being in its set state to transfer the contents of said second shift register into said first shift register, and means in said logic means responsive to a second predetermined count of said state counter for resetting said transfer flip-flop and thus terminating from the transfer of the contents of said second register into said first register.

7. A logic system as recited in claim 1 wherein said array of logic gate means includes an array of AND gate means having inputs connected to said shift register means and state counter means outputs for generating decoding signals responsive thereto, an array of OR gate means having inputs connected to receive said decoding signals for generating different digital counts responsive thereto, and means for applying said different digital count outputs of said array of OR gate means to the inputs to said shift register means and said state counter means.

8. A logic system comprising shift register means having inputs and outputs:

state counter means having inputs and outputs, a source of clock pulses, means for applying clock pulses to said shift register means to cause it to shift, an array of AND gate means connected to receive count outputs from said state counter means and said shift register means and clock pulses for producing first outputs and strobe outputs, an array of OR gate means connected to receive first outputs from said AND gate means for producing responsive thereto different count outputs for said state counter and shift register and display outputs, means for applying said different count outputs respectively to said state counter means and to said shift register means, display means, and means for applying said display outputs and strobe outputs to said display means to be displayed.

9. A logic system comprising a first and a second shift register means respectively, having first and second inputs and first and second outputs:

state counter means having inputs and outputs, a source of clock pulses, an external digital pulse source, an array of AND gate means responsive to an array of OR gate means responsive to said first outputs for providing state counter count outputs, shift register count outputs and display outputs, means for applying said respective state counter and shift register outputs to said state counter and first and second shift register inputs, display means, and means for applying said display strobe pulses and display outputs to said display means to enable it to display information representative of said display outputs.

10. A logic system as recited in claim 9 wherein said AND gate means and said OR gate means responsive to a predetermined count from said state counter means recirculates the output of said second shift register means to the input to said second shift register means.

11. A logic system as recited in claim 9 wherein said AND gate means and OR gate means include logic gate means responsive to receiving a predetermined count from said state counter means and from said first shift register means to transfer the contents of said first shift register means into said second shift register means through said OR gate and said AND gate means.

12. A logic system comprising:

an array of AND gate means having inputs connected for providing first outputs responsive to predetermined digital logic signal patterns, an array of OR gate means having inputs connected for providing digital logic signal outputs responsive to said first outputs, state counter means having inputs connected to receive some of the digital logic signal outputs from said array of OR gate means and having outputs connected to some of the inputs of said AND gate means, and shift register means having inputs connected to receive other of the digital logic signal outputs from said array of OR gate means and having outputs connected to others of the inputs of said AND gate means.

13. A logic system as recited in claim 12 wherein said logic system includes display means responsive to some of said digital logic outputs from said array of OR gate means for visually indicating digital data representative of said digital logic.

14. A logic system as recited in claim 13 wherein said array of AND gate means includes means responsive to the outputs of said shift register means for generating display encoded outputs, said array of OR gate means include means responsive to the display encoded outputs for generating decoded display outputs, said array of AND gate means includes means responsive to predetermined counts of said state counter for producing different display strobe signals, and means for applying said decoded display outputs and said different display strobe signals to actuate said display means.

15. A logic system as recited in claim 12 wherein there is included a source of clock pulses:

means for applying clock pulses to said shift register means and to said array of AND gate means to actuate said shift register and said array of AND gate means, said AND gate means and OR gate means including means responsive to the digital logic output signals of said state counter means and said shift register means for inserting into said state counter means and shift register means incremented digital data.

16. A logic system as recited in claim 13 wherein said OR gate means inserts into said shift register means said AND gate means first outputs responsive to which said OR gate means provide some digital logic outputs to which said display means is responsive.

17. A logic system as recited in claim 16 wherein said shift register means into which said OR gate means inserts said AND gate means first outputs includes a display shift register means for circulating between said OR gate means and said AND gate means data representative of data to be displayed from the outputs of said array of OR gate means, and data shift register means for circulating digital data from the outputs of said array of OR gate means to the inputs to said array of AND gate means.

* * * * *